United States Patent [19]
Craig

[11] Patent Number: 6,033,464
[45] Date of Patent: Mar. 7, 2000

[54] MARKING COMPOSITION

[75] Inventor: Michael S. Craig, Easton, Pa.

[73] Assignee: Binney & Smith Inc., Easton, Pa.

[21] Appl. No.: 09/098,989

[22] Filed: Jun. 17, 1998

Related U.S. Application Data

[63] Continuation-in-part of application No. 08/764,151, Dec. 12, 1996.
[60] Provisional application No. 60/011,497, Feb. 12, 1996.

[30] Foreign Application Priority Data

Dec. 12, 1997 [WO] WIPO .................. PCT/US97/22930

[51] Int. Cl.⁷ ..................................................... C09D 11/00
[52] U.S. Cl. ..................................... 106/31.29; 106/31.08
[58] Field of Search ............................. 106/31.29, 31.08

[56] References Cited

U.S. PATENT DOCUMENTS

| | | |
|---|---|---|
| 2,623,827 | 12/1952 | Moos . |
| 2,835,604 | 5/1958 | Aronberg . |
| 3,409,574 | 11/1968 | Gros . |
| 3,627,546 | 12/1971 | Coppeta . |
| 3,933,708 | 1/1976 | Brinkman . |
| 3,993,492 | 11/1976 | Woolly . |
| 4,212,676 | 7/1980 | Ueda . |
| 4,484,952 | 11/1984 | Bes et al. . |
| 4,525,214 | 6/1985 | Panken . |
| 4,606,914 | 8/1986 | Miyoshi . |
| 4,768,987 | 9/1988 | Usui et al. . |
| 4,840,669 | 6/1989 | Hughes et al. . |
| 4,978,390 | 12/1990 | Sndedker . |
| 4,990,013 | 2/1991 | Hejmanowski . |
| 5,055,498 | 10/1991 | Brachman . |
| 5,261,952 | 11/1993 | Craig . |
| 5,383,954 | 1/1995 | Craig . |

FOREIGN PATENT DOCUMENTS

WO98/26017  6/1998  WIPO .

*Primary Examiner*—Helene Klemanski
*Assistant Examiner*—Veronica F. Faison
*Attorney, Agent, or Firm*—Leydig, Voit & Mayer, Ltd.

[57] ABSTRACT

Disclosed is a marking composition suitable for preparing crayons comprising a fatty acid, a hard wax, an emollient, and a colorant. In some embodiments, the marking composition may also contain a soft wax. In some other embodiments, the marking composition comprises a fatty acid, a hard wax, a soft wax, and a colorant. The marking composition has smooth laydown characteristics when applied on substrates. The composition is also substantially free of tackiness to the touch.

41 Claims, No Drawings

MARKING COMPOSITION

This application is a continuation-in-part of prior U.S. provisional patent application Ser. No. 08/764,151 filed Dec. 12, 1996.

TECHNICAL FIELD OF THE INVENTION

The present invention relates to a marking composition and to a writing instrument such as a crayon fabricated from such a marking composition. In particular, this invention relates to a marking composition useful as crayons that have desirable laydown characteristics when applied on substrates such as paper.

BACKGROUND OF THE INVENTION

Marking compositions are well known in the art that are formulated from combinations of waxes, fatty acids, colorants, color extenders, and other additives. These marking compositions can be used to fabricate crayons, which can be used to draw, write, or color on porous and non-porous substrates. Crayons are most often used by children on various types of paper, such as notebook paper, art paper, and posterboard. Furthermore, crayons are available in a wide selection of colors, ranging from primary colors to fluorescent colors.

A variety of crayons and marking compositions have been disclosed in the patent literature. See, for example, U.S. Pat. Nos. 3,409,574, 3,933,708, 4,212,676, 4,990,013, and 5,383,954. Despite this availability, consumers desire crayons with improved properties to obtain better laydown and better drawing qualities as well as less flaking from completed drawings using the crayons.

Laydown is a measure of the smoothness qualities with which the writing composition transfers to the writing surface. Children prefer crayons having improved laydown since they can produce marks and crayon drawings while exerting minimal pressure on the crayon. Smooth and slick color laydown is especially important to children who are mentally or physically impaired. An added benefit which is especially desired by children is that a crayon having improved laydown characteristics yields marks having richer and more brilliant colors. While the crayons of U.S. Pat. No. 5,383,954 are excellent crayons, in use the crayons yield a considerable amount of flaking. Flaking, or loose particles of crayon material, can present a clean-up problem in the home when children use crayons which flake since the flakes can be ground into the working surface or, as is often the case, home carpeting.

Others have proposed that laydown of crayons may be improved by increasing the amounts of emollients, for example, oils such as castor oil, in the crayon formulation. Although this approach has had some success in improving laydown, the emollient adversely affects other desirable properties of the marking composition. For example, the strength of the writing instrument made from such compositions decreases resulting in manufacturing problems as well as problems in the use of these writing instruments. For example, writing instruments such as crayons formed from such compositions break or crumble rather easily, especially when used by children.

The use of greater amounts of emollients also adversely affects the tackiness of the writing instrument. For example, the writing instrument becomes excessively tacky to the touch, especially when held between the fingers during writing. This excessive tackiness creates an unpleasant feeling for the user. There may also be excessive transfer of some of the components of the writing composition, for example, the pigment, to the user's hands or clothes. The excessive transfer of materials, besides creating an unpleasant feeling to the user, can cause unnecessary stains to the hands and clothes as well as in areas such as carpets where children use the crayons.

One attempt to create a better children's crayon is found in U.S. Pat. No. 5,383,954 by the present inventor. The glitter crayon disclosed in the patent excels at trapping glitter on a page when a mark is made. The crayons made according to this patent exhibit significant levels of product laydown with accompanying high levels of flaking of excess crayon material.

Thus, there remains a need for a marking composition that has the desirable laydown characteristics. More particularly, there is a need for a marking composition that minimizes friction between the crayon and the substrate to allow for a smooth and slick laydown of color with minimal exertion of pressure by the user. There also remains a need for a marking composition with improved laydown properties that is not overly tacky to the touch and does not exhibit excessive flaking. There further remains a need for a marking composition having improved laydown properties which does not excessively transfer materials to the hands or clothes of the user. There further remains a need for a marking composition having improved laydown characteristics that has the desirable mechanical strength to withstand use by children.

These and other objects and advantages of the present invention, as well as additional inventive features, will become apparent from the description of the present invention provided herein.

SUMMARY OF THE INVENTION

The foregoing needs are fulfilled to a great extent by the present invention which provides a marking composition that exhibits improved color coverage, color intensity and uniformity and smooth and slick laydown with minimal exertion of pressure as well as less flaking than the glitter crayons of U.S. Pat. No. 5,383,954 when applied on substrates. The marking composition is also substantially free of tackiness to the touch.

The marking composition of the present invention comprises combinations of a fatty acid, an emollient, a colorant, a hard wax, and a soft wax, wherein at least a portion of the waxes are ester waxes in such amounts that the composition has the desired smooth laydown characteristics when applied on substrates. In other embodiments, the marking composition of the present invention comprises a fatty acid, a hard wax, a soft wax, and a colorant.

The present invention further provides writing instruments such as crayons prepared from the marking composition of the present invention.

While the invention has been described and disclosed below in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENTS

In accordance with one embodiment of the present invention, the marking composition comprises a fatty acid, an emollient, a colorant, a hard wax and a soft wax wherein at least a portion of the waxes are ester waxes in amounts such that the composition has the smooth laydown characteristics when applied on substrates. In another embodiment of the invention, the marking composition comprises a fatty acid, a hard wax, a soft wax, and a colorant. The compositions also have the advantage that they are substantially free of tackiness to the touch.

The present inventive composition is particularly well-suited for use in preparing crayons. A detailed discussion of each of the ingredients used in making the marking compositions of the invention is set forth below.

The marking composition may contain any suitable fatty acid. The fatty acid may be a saturated fatty acid, an unsaturated fatty acid, or a mixture of fatty acids. Preferably, the fatty acid is one that adds strength to the composition, especially when the composition is fabricated as a crayon. Longer carbon chain fatty acids generally impart greater hardness and mechanical strength to the composition. The fatty acid generally has from about 12 to about 30 carbon atoms, and preferably from about 16 to about 24 carbon atoms. Suitable fatty acids include lauric acid, myristic acid, palmitic acid, stearic acid, and mixtures thereof. Stearic acid is a preferred fatty acid.

The amount of fatty acid used depends to some extent on the amount of other materials constituting the marking composition, particularly the amount of hard wax employed. The fatty acid content can be lowered if the hard wax content is suitably increased to provide the desired mechanical strength. The fatty acid may be present in any suitable amount, for example, it can be present in an amount up to about 60% by weight of the composition. In certain embodiments, the fatty acid is present in an amount of from about 3% by weight to about 15% by weight of the marking composition, and in certain other embodiments, the fatty acid is present in an amount of from about 15% by weight to about 30% by weight of the marking composition. Some other embodiments include a fatty acid in an amount of from about 30% by weight to about 55% by weight of the marking composition.

The marking composition of the present invention also comprises at least one hard wax. The hard wax also imparts desired hardness and mechanical strength to the crayon. Any suitable hard wax can be used. Preferably a wax having a penetration of about 40 mm or less at 25° C., as determined by the needle penetration method set forth in ASTM D1321 is used.

Examples of suitable hard waxes include candelilla wax, carnauba wax, beeswax, microcrystalline wax, fatty acid esters, and alkali and alkaline earth metal and ammonium salts of fatty acids, and combinations thereof. Any other appropriate hard wax may be used.

Several hard waxes are commercially available. Examples include the synthetic candelilla wax having a melting point of 72.5–82.5° C., an acid value of 14–25, a saponification value of 44–66, and a needle penetration of 1–4 mm (100 g, 5 sec, 25° C.), and available from Koster Keunen, Inc. in Watertown, Conn. This wax has the general composition of 50% hydrocarbons, 40% esters and 10% acids by weight. Other examples of hard waxes available from Koster Keunen, Inc. are set forth in Table 1 below along with their physical properties.

Natural hard waxes such as paraffin wax, candelilla wax, beeswax, carnauba wax, ceresine wax, and ozokerite wax which are suitable for use in the composition of the present invention can also be obtained from Koster Keunen, Inc. Natural candellilla wax contains approximately 50% hydrocarbons, 28% esters, 12% neutral resins, and 7% acids. The natural beeswax contains about 70% esters, 13% hydrocarbons, 12% fatty acids, and 4% fatty alcohols. Natural carnauba wax contains about 70% monoesters, 15% free alcohols, 5% fatty acids, 5% resins, and 5% other materials. Natural ceresine wax is a blend of hydrocarbon mineral waxes mainly consisting of parafin waxes, and has a melting point of 130–170° F. Ozokerite wax is a blend of hydrocarbon mineral waxes mainly consisting of microcrystalline wax and has a melting point of 160–180° F.

Microcrystalline wax may be a hard wax or a soft wax. A hard microcrystalline wax suitable for use in the present invention can be obtained from Witco in Greenwich, Conn., as MULTIWAX W445, having a melting point of 54–102° C. Examples of other commercially available hard waxes include the Polymer Wax AV518 having a drop point of 50–55° C. (ASTM D3 954) and a zero acid content is available from Hoechst Celanese, Somerville, N.J. Hoechst Wax LP is a hard acid wax having a drop point of 82–89° C. (ASTM D 566) and an acid number of 113–130. Hoechst Wax S is also a hard acid wax having a drop point of 81–87° C. (ASTM D 566) and an acid number of 130–150. Hoechst Wax E is an ester derived from Montan wax having a drop point of 79–85° C. (ASTM D 566) and an acid number of 15–20. Hoechst Wax F has a drop point of 77–83° C. (ASTM D 566) and an acid number of 6–10. Hoechst Wax KSL is a hard ester wax having a drop point of 80–85° C. (ASTM D 566) and an acid number of 28–38. LIPOWAX™ KB2-46-2 is a hard, cream-colored wax produced by Lipo Chemicals, Inc. in Paterson, N.J., and has a melting point of approximately 60° C. The composition of LIPOWAX KB2-46-2 is believed to be a trade secret.

Table I describes, but does not in any way limit, hard waxes suitable for use in the present invention is presented below. Table I details various properties of the hard waxes set forth therein.

TABLE I

Some Examples of Commercially Available Waxes

| Kester Wax[1] | A.V. | E.V. | H.V. | M.P. | Pen. | <M> | <n> | I.V. |
|---|---|---|---|---|---|---|---|---|
| K-48 | <2 | 116–120 | <4 | 47–49° C. | <10 | 478 | 32.3 | <2 |
| K-56 | <2 | 101–105 | <4 | 54–56° C. | <10 | 538 | 37 | <2 |
| K-59 | <2 | 97–102 | <4 | 57–59° C. | <10 | 553 | 37.4 | <2 |
| K-62 | <2 | 93–97 | <4 | 61–63° C. | <10 | 580 | 39.3 | <2 |
| K-72 | <2 | 78–90 | <4 | 70–74° C. | <10 | 650 | 44 | <2 |
| Synthetic Beeswax | 17–24 | 70–80 | <15 | 60–65° C. | ~15 | 658 | 45.6 | <15 |
| Synthetic Carnauba | 2–7 | 75–85 | <40 | 82–86° C. | <2 | 750 | 54 | <12 |

TABLE I-continued

Some Examples of Commercially Available Waxes

| Kester Wax[1] | A.V. | E.V. | H.V. | M.P. | Pen. | <M> | <n> | I.V. |
|---|---|---|---|---|---|---|---|---|
| K-82 | <5 | 70–85 | <10 | 82–86° C. | <2 | 732 | 50 | <4 |
| K-100 | <5 | 65–85 | <10 | 95–105° C. | <2 | 980 | 68 | <4 |
| K-82D[2] | <5 | 50–70 | <5 | 78–83° C. | >10 | 1350 | 92 | <5 |

A.V. = acid value
E.V. = ester value
H.V. = hydroxy value
M.P. = melting point
<M> = average molecular weight
<n> = average carbon chain length
I.V. = iodine value
Pen. = penetration, mm at 25 C. by ASTM D1321
[1]Available from Koster Keunen, Inc., Watertown, Connecticut
[2]K-80D22 is a hard wax comprising straight chain even numbered diesters.

Any suitable amount of the hard wax can be included in the composition of the present invention. The hard wax can be present in an amount of up to about 64% by weight of the marking composition. In certain embodiments, the hard wax is present in an amount of from about 39% by weight to about 64% by weight of the marking composition, and preferably in an amount of from about 45% by weight to about 55% by weight of the marking composition. Excessive amounts of hard wax can adversely affect the laydown property. In certain other embodiments, for example, where the amount of emollient is low or none, the hard wax can be present in an amount of from about 10% by weight to about 30% by weight of the marking composition, and preferably in an amount of from about 15% by weight to about 25% by weight of the marking composition.

Generally, the compositions of the invention also include an emollient, a soft wax, or a combination of an emollient and a soft wax. When both a soft wax as described below and an emollient are used, the hard wax preferably is used in an amount that is substantially equal to the amount of soft wax, and more preferably in amount greater than that of the soft wax. It is desirable to include an emollient in compositions of the invention to enable the marking composition to be more readily and easily transferred to a substrate through normal application of the marking composition to the substrate. The emollient thus provides a lubricant effect or slipperiness to the marking composition to facilitate the gliding of the marking composition across the surface of a substrate and to ensure a smooth laydown of the marking composition onto the substrate.

The emollient also assists in ensuring the retention of certain other ingredients such as glitter in the marking composition transferred to the substrate. As such, the emollient typically is a liquid or paste at room temperature and is preferably miscible with the other components in the composition, particularly the wax or the fatty acid. In certain embodiments however, the emollient may be a solid such as a flake.

Any suitable emollient may be used in the present inventive marking composition. Emollients such as lanolin oil and its derivatives, mineral oil, fatty esters, fatty acid esters, fatty alcohols, mono- and di-esters of propylene glycols, glycerol di-esters, mono- and di-esters of polyethylene glycols, petrolatum, vegetable shortenings, dimers and trimers of fatty acids, plant oils, silicones, and mixtures thereof are suitable for use in compositions of the invention.

Suitable lanolin derivatives include acetylated lanolin, acetylated lanolin alcohol, hydrogenated lanolin, lanolin alcohol, lanolin acids, isopropyl lanolate, lanolin wax, and hydroxylated lanolin. Suitable fatty esters and fatty acid esters include isopropyl myristate, myristyl myristate such as that marketed as LIPONATE MM by Lipo Chemicals of New Jersey, and esterified fatty acid propoxylates such as polyoxypropylene (2) myristyl ether propionate. Also suitable is tridecyl trimellitate such as that marketed as LIPONATE TDTM by Lipo Chemicals. Suitable fatty alcohols include oleyl alcohol, and suitable vegetable shortenings include KREMIT® (Armour, Omaha, Nebr.). Suitable plant oils include castor oil, coconut oil, olive oil, peanut oil, safflower oil, sesame oil, soybean oil, wheat germ oil, corn oil, avocado oil, almond oil, grape seed oil, jojoba oil, apricot kernel oil, palm oil, and sunflower seed oil. Suitable silicones include DOW-CORNING® 556, 593, and 1107 fluids (Dow-Corning, Midland, Mich.). Other possible emollients include longer chain hydrocarbons, particularly alkenes, such as polyoxypropylene-polyoxyethylene block copolymers such as PLURONIC® 25R4 and PLURONIC 25R8 (BASF, Parsippany, N.J.).

The emollient may be present in any suitable amount, for example, in an amount of up to 45% by weight of the marking composition, and preferably in an amount of from about 5% to about 25% by weight of the marking composition. Excessive amounts of emollients can increase the tackiness adversely. In certain embodiments, especially the embodiments having a large amount of a soft wax, the emollient can be present in a low amount or omitted while still maintaining the desired improved laydown characteristics.

As noted above, either an emollient or a soft wax, or a combination of emollient and soft wax is included in compositions of the invention. Soft waxes suitable for use in compositions of the invention generally have a needle penetration of greater than about 40 mm at 25° C., according to ASTM D1321.

Examples of soft waxes suitable for use in the invention include Lanolin Wax having a melting point of 52° C. maximum and 0.56% maximum free fatty acid content and available from the Fanning Corporation in Chicago, Ill. Other examples of suitable soft waxes include hydrogenated lanolin available under the name of FANCOL HL™ which is a mixture of fatty alcohols also available from the Fanning Corporation; hydrogenated castor oil available from Caschem, Inc. in Bayonne, N.J., as CASTORWAX™ MP-70, and having a freezing/melting point of 158° F.; and LIPOWAX KB2444 produced by Lipo Chemicals which is a cream-colored wax having a melting point of about 90° C.

The exact composition of LIPOWAX KB2444 is believed to be a trade secret of Lipo Chemicals.

Another example of a soft wax is a hydroxypolyester which is 7-hydroxy isohexanol polyester having a melting point of 74–84° C., an acid value of less than 5, an ester value of 50–70, a hydroxyl value of 35–50, a needle penetration of greater than 50 mm at 25° C. by ASTM D1321, an average molecular weight of about 1000, an average carbon length of 66, and an iodine value of less than 5, and is available from Koster Keunen, Inc. Certain soft waxes, particularly the hydroxypolyester, help to hold emollients used in compositions of the invention in placer thereby acting as gelling agents. These soft waxes help make the marking composition less oily to the touch.

Any suitable amount of the soft wax can be used to prepare the marking composition. The soft wax can be present in an amount of up to about 60% by weight of the marking composition. In certain embodiments, for example, where the amount of emollient is low or none, the soft wax can be present in an amount of from about 20% by weight to about 60% by weight of the marking composition. In certain other embodiments, for example, where an emollient is present in a significant amount, the soft wax can be present in an amount of up to about 4% by weight of the marking composition.

As can be seen above, certain of both the hard waxes and the soft waxes are termed ester waxes. Ester waxes may be naturally occurring waxes such as beeswax, carnauba wax or rice wax. In addition, some synthetic waxes, such as the Kester Waxes™ marketed by Koster Keunen, Inc., are ester waxes. The Kester Waxes™ are composed of various esters which are prepared by esterification of natural plant fatty acids and natural plant fatty alcohols. By means of this process, saturated ester mixtures are obtained which can have a carbon chain length from 22 to 46 atoms. Ester waxes may be mono-ester waxes, di-ester waxes, poly-ester waxes, and hydroxy acid ester waxes. The ester waxes may be saturated, unsaturated or branched esters ranging from about $C_{22}$ through about $C_{100}$.

The marking composition preferably contains a colorant which can be a pigment or dye. The pigment may be an inorganic pigment, an organic pigment, or a mixture thereof. The inorganic pigment is preferably iron blue, iron oxide, zinc oxide, ultramarine blue, titanium dioxide, or a mixture thereof. The organic pigment is preferably an azo, a naphthol, a dianisidine orange, a lithol, a diarylide yellow or a phthalo pigment. The pigment may be combined with a clay carrier, if desired. Dyes, either acidic or basic, can be used in the present inventive marking composition.

The pigment can have any suitable particle size, however, a preferable particle size is from about 0.1 micron to about 25 microns. More preferably, the pigment has a particle size of about 0.3 micron to about 20 microns, and, even more preferably, the pigment particle size is in the range of about 0.5 micron to about 15 microns.

Examples of suitable dyes include the polymeric colorants REACTINT™ brand Blue×3LV, Orange×38, and Violet×80LT, available from the Milliken Chemical Co. in Inman, S.C. These are dark viscous liquids containing the dyes Blue×3LV, Orange×38, and Violet x 80LT.

The colorant may be present in any suitable amount. The present inventive marking composition preferably contains pigment in an amount of from about 0.5% to about 20% by weight of the marking composition, more preferably from about 2% to about 15% by weight of the marking composition. Where a dye colorant is used, it may be included in an amount of from about 1% by weight to about 3% by weight of the marking composition.

The marking composition of the present invention can contain additional ingredients such as glitter.

The glitter may be of any suitable material and will generally comprise a metallic material, a nonmetallic material, or, more commonly, a reflective material coating, such as a metal coating, on a suitable substrate such as a polymer or other solid organic substrate. Suitable metallic glitters include particles or flakes of aluminum, copper, silver, gold, brass, or other metals. Suitable non-metallic glitters include particles or flakes of cellulose acetate, poly (ethylene terephthalate), polymethacrylate, poly (vinylbutyral), and the like. Suitable metallized glitters include coated metallized materials such as coated aluminum metallized cellulose acetate, poly(ethylene terephthalate), polymethacrylate, poly(vinylbutyral), and the like. Coated aluminum metallized poly(ethylene terephthalate) is the preferred glitter for use in the context of the present invention.

The glitter may be of any color (e.g., silver, gold, blue, red, etc.) or even a mixture of colors. If pigment is present in the marking composition, the glitter may be the same color as the pigment or a different color from the pigment.

The glitter also may be of any dimensions that are suitable for use in such a composition. The glitter is preferably less than about 0.05×0.05×0.005 cm (0.02×0.02×0.002 inches) in size, more preferably less than about 0.03×0.03×0.003 cm (0.01×0.01×0.001 inches) in size, and most preferably about 0.02×0.02×0.003 cm (0.008×0.008×0.001 inches) to about 0.02×0.02×0.001 cm (0.008×0.008×0.0005 inches), or even about 0.01×0.01×0.001 cm (0.004×0.004×0.005 inches) or less, in size, although glitter which is too small in size may not exhibit a desirable glitter effect.

The glitter may be present in any suitable amount, preferably less than about 15% by weight of the marking composition, more preferably in an amount from about 3% to about 10% by weight of the marking composition, and even more preferably in an amount from about 4% to about 8% by weight of the marking composition.

The marking composition may additionally include a filler. The filler preferably functions as a pigment dispersant or extender, if pigment is added to the marking composition. Any suitable filler may be utilized, such as calcium carbonate, titanium dioxide, talc, silica, clay (e.g., kaolin clay), feldspar, corn starch, mica, and mixtures thereof. Examples of preferred fillers include talc and kaolin clay. The particle size of the filler is preferably 50 microns or less, more preferably 25 microns or less, although if mica is used, the particle size is preferably about 25–75 microns. Talc of about 3–6 microns average diameter particle size is preferred for use in certain embodiments of the present invention. An example of a talc is NYTAL™ 400, which is available from The Vanderbilt Co. in Norwalk, Conn. A preferred talc is a coated talc sold under the tradename Mearl Talc TCA by Mearl Corporation.

In certain embodiments, the filler acts to provide a shimmering effect to the composition. Filler can also be included in compositions of the invention when a pigment is not used. In cerain embodiments, the filler improves the strength of the marking composition and the marking instrument.

Two or more fillers can be combined for use in compositions of the invention. For example, the mica particles can be coated with titanium dioxide. Such a coated mica is available as MAGNAPEARL™ from The Mearl Corporation in Charleston, S.C. MAGNAPEARL can provide smooth laydown as well as a shimmer effect to the marking composition. MAGNAPEARL can also provide added strength to the marking composition and the writing instrument.

The filler may be present in any suitable amount. Preferably filler is used in an amount up to about 20% by weight of the marking composition, and more preferably in an amount of from about 5% to about 15% by weight of the marking composition.

A cleanability additive can also be included in the marking composition of the present invention to aid in the removal of the composition, preferably with mild soap and water, from non-porous surfaces, such as table tops, counter tops, etc. Suitable cleanability additives include polyoxypropylene-polyoxyethylene block copolymers, polyoxyethylene alcohols, polyoxyethylene esters, polyoxyethylene ethers, and derivatives and mixtures thereof.

The marking composition of the present invention preferably contains a cleanability agent such as polyoxyethylene (12) tridecyl ether or alcohol, polyoxyethylene (10) alkyl aryl ether, polyoxyethylene (40) stearate, or polyoxyethylene (20) stearyl alcohol. The marking composition more preferably contains polyoxyethylene (40) stearate (available as LIPOPEG® 39S (Lipo Chemicals, Patterson, N.J.)) or polyoxyethylene (12) tridecyl ether alcohol (available as RENEX® 30 (ICI America, Wilmington, Del.)), most preferably a mixture of the two. Certain emollients may also act as cleanability additives or aid in cleanability, such as polyoxypropylene-polyoxyethylene block copolymers, e.g., PLURONIC® 25R4 or 25R8.

The cleanability additive may be present in any suitable amount. Preferably it is present in an amount up to about 5% by weight of the marking composition, and more preferably in an amount from about 1% to about 4% by weight of the marking composition.

Other additives may be incorporated into the marking compositions of the present invention in minor amounts. For example, processing aids such as foam inhibitors and mold release agents, as well as oxidation and UV stabilizers may be added. These additives are typically used in an amount of from about 0.01% to about 5% by weight of the marking composition, and preferably in an amount of from about 0.1% to about 1% by weight of the marking composition.

Examples of suitable foam inhibitors include petroleum hydrocarbons such as FOAMKILL® 614 (Crucible Chemical Co., Greenville, S.C.) and cetyl dimethicone. Examples of suitable mold release agents include the Group IIA metal salts of fatty acids, particularly calcium stearate. Examples of suitable oxidation stabilizers include sterically hindered phenols. Examples of suitable UV stabilizers include hindered amine light stabilizers and benzotriazoles.

The marking composition of the present invention may be prepared by heating the components to a semisolid, or preferably, liquid, state and mixing them together. Generally, a portion of the waxes and fatty acid, is heated above its melting temperature, e.g., to about 104–116° C. (220–240° F.). Then, the remainder of the waxes and the fatty acid is added to the liquified waxy material, while stirring the composition with suitable stirring means, such as, for example, a disperser head mixer. The filler and colorant are then added in sequence to the composition under continued stirring of the composition. The emollient, along with any other additives such as cleanability agents and the like, are added to the liquified material, while continuing to stir the composition. The composition is then appropriately molded, such as by pouring the composition into flatbed molds. The mold is cooled and the composition is shaped into suitable forms such as crayons.

The marking composition of the present invention is hard enough for children to handle and resists easily breaking, yet is soft enough to allow for the smooth and slick laydown of the composition on a substrate with minimal pressure in the course of the normal marking of a substrate with the composition. Rich and substantially uniform color is also achieved with the marking composition of this invention and there is less flaking than occurs with the "soft" glitter crayons disclosed in U.S. Pat. No. 5,383,954. Thus, the laydown characteristics of compositions of the present invention are improved over such characteristics of previously available compositions.

The marking composition of the present invention is suitable for use in writing instruments, in particular, crayons, and may be applied to a variety of porous and non-porous writing surfaces or substrates.

It will be appreciated by those skilled in the art that the marking compositions of the present invention can be varied, depending upon the selection of certain of the major components and the amounts of those components. This allows the composition to be modified to achieve the desired laydown. Thus, where the preferred components include a hard wax, a soft wax and an emollient, the fatty acid may be included in an amount of from about 30 to about 55% by weight of the entire composition; the hard wax may be included in an amount of from about 10 to about 35% by weight of the entire composition; the soft wax may be included in an amount of from about 1 to about 4% by weight of the entire composition; and the emollient may be included in an amount of from about 10 to about 40% by weight of the entire composition. Filler may be included in compositions of the invention in amounts of from about 0 to about 20% by weight of the entire composition and colorant, such as pigment, may be included in amounts of from about 0 to about 15% by weight of the entire composition. Preferably, in such compositions of the inventions, of the waxes included, from about 10% by weight to about 30% by weight of the total composition are ester waxes.

Specifically, where these various component classes are used in such a relationship, specific ingredients such as the following will yield a composition of the invention set forth in Table II:

TABLE II

| Component | Preferred Range, wt % |
| --- | --- |
| Stearic acid | about 30–about 55 |
| Paraffin wax | about 3–about 10 |
| Syn. Carnauba wax | about 8–about 20 |
| KESTER WAX K80D22 | about 1–about 4 |
| Hydroxypolyester | about 1–about 4 |
| Myristyl myristate | about 2–about 5 |
| Tridecyl trimellitate | about 3–about 10 |
| Castor oil | about 5–about 25 |
| MAGNAPEARL 2000 | about 0–about 20 |
| Colorant | about 2–about 15 |

EXAMPLE 1

| Component | wt % |
| --- | --- |
| Stearic acid | 41.8 |
| Paraffin wax | 6.8 |

-continued

| Component | wt % |
|---|---|
| Syn. Carnauba wax | 13.6 |
| KESTER WAX 80D22 | 1.7 |
| Hydroxypolyester | 1.7 |
| LIPONATE MM | 3.4 |
| LIPONATE TDTM | 5.4 |
| Castor Oil | 8.2 |
| MAGNAPEARL 2000 | 6.8 |
| Ultramarine Blue | 10.6 |
| | 100.0 |

A crayon was formed from the coloring composition of Example 1. The crayon exhibited the desired smooth laydown characteristics.

Compositions of the invention may also be prepared using a fatty acid, a hard wax, soft wax, and an emollient in a composition where the fatty acid is present in an amount of from about 3 to about 25% by weight of the entire composition; the hard wax is present in an amount of from about 39 to about 64% by weight of the entire composition; the soft wax is included in an amount of from about 1 to about 4% by weight of the entire composition; and the emollient is present in an amount of from about 5 to about 15% by weight of the entire composition. In such a composition, filler is included in amounts of from about 1 to about 15% by weight of the entire composition and a colorant is included in amounts of from about 1 to about 15% by weight of the entire composition. Where a dye colorant is used, typically from about 1% to about 3% by weight of the total composition is included. Preferably, in such compositions of the inventions, of the waxes included, from about 10% by weight to about 25% by weight of the total composition are ester waxes.

Specifically, where these various component classes are used in such a relationship, specific ingredients such as the following will yield a composition of the invention set forth in Table III:

TABLE III

| Component | preferred range, wt % |
|---|---|
| Stearic acid | about 3–about 25 |
| Paraffin wax | about 30–about 45 |
| Syn. Carnauba wax | about 8–about 15 |
| KESTER WAX K80D22 | about 1–about 4 |
| Hydroxypolyester | about 1–about 4 |
| Castor Oil | about 5–about 15 |
| MAGNAPEARL 2000 | about 1–about 15 |
| Colorant | about 1–about 3 |

EXAMPLE 2

This example illustrates the preparation of such an embodiment of the marking composition of the present invention. The following ingredients were combined and melt mixed to obtain a marking composition having smooth laydown characteristics.

| Component | wt % |
|---|---|
| Stearic acid | 22.2 |
| Paraffin wax | 37.5 |
| Syn. Carnauba wax | 12.1 |

-continued

| Component | wt % |
|---|---|
| KESTER WAX K80D22 | 1.5 |
| Hydroxypolyester | 1.5 |
| Castor Oil | 12.6 |
| MAGNAPEARL 2000 | 12.6 |
| Liquid Dye (Milliken Color) | 1.5 |
| | 100.0 |

A third embodiment of the invention may be prepared where only the primary components of a fatty acid, a hard wax, and a soft wax are used. In such a composition, the fatty acid is present in an amount of from about 15 to about 30% by weight of the entire composition; the hard wax is present in an amount of from about 10 to about 30% by weight of the entire composition; the soft wax is included in an amount of from about 20 to about 60% by weight of the entire composition. In such a composition, filler may be included in amounts of from about 5 to about 20% by weight of the entire composition and a colorant is typically included in amounts of from about 1 to about 15% by weight of the total composition and more preferably from about 1% to about 5% by weight of the entire composition.

Specifically, where these various component classes are used in such a relationship, specific ingredients such as the following will yield a composition of the invention set forth in Table IV:

TABLE IV

| Component | preferred range, wt % |
|---|---|
| Stearic Acid | about 15–about 30 |
| LIPOWAX KB2444 | about 20–about 60 |
| LIPOWAX KB2462 | about 5–about 15 |
| Paraffin wax | about 5–about 15 |
| FOAMKILL 614 | about 0.1–about 1 |
| NYTAL 400 (talc) | about 5–about 20 |
| Colorant | about 1–about 5 |

EXAMPLE 3

Example 3 illustrates the preparation of an embodiment of such a the marking composition of the present invention. The following ingredients were combined and melt mixed to obtain a marking composition having smooth laydown characteristics.

| Component | wt % |
|---|---|
| Stearic Acid | 19.6 |
| LIPOWAX KB2444 | 43.2 |
| LIPOWAX KB2462 | 9.8 |
| Paraffin wax | 9.8 |
| FOAMKILL 614 | 0.3 |
| NYTAL 400 | 14.4 |
| Phthalo green pigment | 2.9 |
| | 100.0 |

EXAMPLES 4–15

A further set of examples of compositions of the invention (Examples 4–7) were prepared to enable a comparison with various prior art crayons. The following examples of compositions of the invention were prepared:

| Component | Ex. 4 Red wt % | Ex. 5 Green wt % | Ex. 6 Yellow wt % | Ex. 7 Orange wt % |
| --- | --- | --- | --- | --- |
| Stearic acid | 18.0 | 17.8 | 19.6 | 18.8 |
| Paraffin wax | 33.5 | 33.23 | 36.41 | 35.02 |
| Syn. Candelilla wax | 8.2 | 8.0 | 8.8 | 8.5 |
| KESTER WAX K82D wax | 1.6 | 1.6 | 1.7 | 1.7 |
| Hydroxypolyester wax | 2.7 | 2.7 | 2.9 | 2.8 |
| Peg-40 Stearate | 1.6 | 1.6 | 1.7 | 1.7 |
| Castor oil | 10.9 | 10.7 | 11.8 | 11.3 |
| Mearl Talc TCA (coated talc) | 13.6 | 13.4 | 14.7 | 14.2 |
| Colorant-Pigment | 9.6 | 10.7 | 2.1 | 5.7 |
| Cetyl Dimethicone defoamer | 0.3 | 0.27 | 0.29 | 0.28 |
| Total | | | | |

For comparison, four regular crayons typically manufactured for use by children and commercially available from the assignee of the present invention were tested. Each of the crayons of Examples 8–11 is composed of stearic acid, paraffin wax, talc and a colorant. Example 8 is a red crayon, Example 9 is green, Example 10 is yellow, and Example 11 is orange.

Finally, for further comparison, four glitter crayons made according to U.S. Pat. No. 5,383,954 were prepared as follows:

| Component | Ex. 12 Red wt % | Ex. 13 Green wt % | Ex. 14 Yellow wt % | Ex. 15 Orange wt % |
| --- | --- | --- | --- | --- |
| Stearic acid | 22.8 | 21.5 | 3.8 | 22.7 |
| Paraffin wax | 42.3 | 39.74 | 44.22 | 42.13 |
| Witco W835 wax | 2.7 | 2.6 | 2.8 | 2.7 |
| Peg-40 Stearate | 2.2 | 2.1 | 2.3 | 2.2 |
| Mineral Oil | 2.8 | 2.6 | 2.8 | 2.7 |
| Castor oil | 10.9 | 10.3 | 11.3 | 10.8 |
| Nytal 400 Talc | 6.8 | 6.5 | 7.0 | 6.8 |
| Colorant-Pigment | 4.8 | 10.3 | 1.0 | 5.4 |
| Silver Glitter | 4.4 | 4.1 | 4.5 | 4.3 |
| Cetyl Dimethicone defoamer | 0.3 | 0.26 | 0.28 | 0.27 |
| Total | | | | |

Compositions of each of the formulations of Examples 4 through 15 were molded into crayons. Rubouts were then made using the crayons according to a standard test procedure as follows:

Four sheets of sixty pound bond paper are stacked one on top of the other and positioned on a slough tester such that a rubout will be made near the top of the first sheet of paper. The paper is then locked in position. The crayon is then weighed and the weight is recorded. The crayon is then inserted into the slough tester holder so that the point of the crayon is touching the paper without putting pressure on the paper. The crayon holder is tightened to hold the crayon in place. The slough tester arm is then pulled down with an 800 gram weight and the pressure is applied to the crayon. The slough tester is then turned on and is left on until the machine completes a second pass on the paper with the crayon.

The crayon is then locked in the up position and the paper is re-positioned so that another rubout can be made next to the two-pass rubout. The crayon is then adjusted so that the point rests on the paper with no pressure and the crayon is locked in place. The 800 gram weight is again applied to the slough tester arm and the machine is turned on until the crayon makes three passes on the paper. At this point, rubouts from a total of five passes have been made. The tester is then turned off and the crayon is removed from the tester. The crayon is then weighed.

The paper on which the rubouts have been made is then carefully removed from the slough tester and weighed taking care not to knock any flakes of crayon off of the paper. Any flakes on the paper are then lightly brushed off and the paper is reweighed. At this point, three measurements of the crayon being tested made be assessed. First, the wear rate of the crayon may be calculated by subtracting the final weight of the crayon from the crayon's original weight. Second, the amount of flaking may be calculated by subtracting the weight of the paper with the rubout after the flakes are brushed off from the weight of the paper, rubout and flakes. Third, the transfer weight may be calculated by subtracting the weight of the flakes from the wear rate.

The data for the crayons prepared from Examples 4 through 15, is set forth in Table V, below.

TABLE V

| | Wear Rate gms | Flaking gms | Transfer Weight gms |
| --- | --- | --- | --- |
| Example 4 | 0.0260 | 0.0024 | 0.0236 |
| Example 5 | 0.0263 | 0.0030 | 0.0233 |
| Example 6 | 0.0194 | 0.0020 | 0.0174 |
| Example 7 | 0.0244 | 0.0025 | 0.0219 |
| Example 8 | 0.0256 | 0.0010 | 0.0246 |
| Example 9 | 0.0196 | 0.0020 | 0.0176 |
| Example 10 | 0.0257 | 0.0015 | 0.0242 |
| Example 11 | 0.0178 | 0.0008 | 0.0170 |
| Example 12 | 0.0435 | 0.0099 | 0.0336 |
| Example 13 | 0.0467 | 0.0150 | 0.0317 |
| Example 14 | 0.0475 | 0.0143 | 0.0332 |
| Example 15 | 0.0457 | 0.0134 | 0.0323 |

Easily seen from the data in Table V is that the crayons of the present invention as prepared in Examples 4 through 7 provided better laydown of crayon than the traditional crayon of Examples 8 through 11. While providing this better laydown, the crayons of Examples 4 through 7 produced substantially less flaking than the glitter crayons of Examples 12 through 15. In addition, the marks made by the crayons of the present invention were of substantially higher quality than those made by the regular crayons (Examples 8–11) or the glitter crayons (Examples 12–15). The color was richer and more uniform in appearance.

While this invention has been described with emphasis upon a preferred embodiment, it will be obvious to those of ordinary skill in the art that the preferred composition may be varied. It is intended that the invention may be practiced otherwise than as specifically described herein. Accordingly, this invention includes all modifications encompassed within the spirit and scope of the following claims.

What is claimed is:

1. A marking composition comprising a fatty acid in an amount of from about 30% by weight to about 55% by weight of the composition, a hard wax in an amount of from about 10% by weight to about 35% by weight of the composition, a soft wax in an amount of from about 1% by weight to about 4% by weight of the composition, and an emollient in an amount of from about 10% by weight to about 40% by weight of the composition, wherein of said hard waxes and said soft waxes from about 10% to about 30% by weight of said composition are ester waxes.

2. The marking composition of claim 1, wherein said fatty acid has from about 16 to about 30 carbon atoms.

3. The marking composition of claim 2, wherein said fatty acid is stearic acid.

4. The marking composition of claim 1, wherein said ester wax is selected from the group consisting of mono-ester waxes, di-ester waxes, poly-ester waxes, and hydroxy acid ester waxes having a carbon chain length of from about 22 to about 100.

5. The marking composition of claim 4, wherein said ester wax is selected from the group consisting of hydroxy polyester, beeswax, rice wax, synthetic beeswax, carnauba wax, synthetic carnauba wax, and an ester wax having an acid value less than 5, an ester value between 50 and 70, and a melting point between 78 and 83° C.

6. The marking composition of claim 1, wherein said hard wax is selected from the group consisting of candelilla wax, carnauba wax, ester waxes, beeswax, microcrystalline wax, fatty acid esters, and alkali and alkaline earth metal and ammonium salts of fatty acids, and combinations thereof.

7. The marking composition of claim 1, wherein said soft wax is selected from the group consisting of microcrystalline wax, vegetable fats, animal fats, ester waxes, fatty acid esters, and alkali and alkaline earth metal and ammonium salts of fatty acids, and hydroxypolyesters, and combinations thereof.

8. The marking composition of claim 1, wherein said emollient is selected from the group consisting of lanolin oil and its derivatives, mineral oil, fatty esters, fatty acid esters, fatty alcohols, mono- and di-esters of propylene glycols, glycerol di-esters, mono- and di-esters of polyethylene glycols, petrolatum, vegetable shortening, dimers and trimers of fatty acids, plant oils, silicones, and combinations thereof.

9. The marking composition of claim 8, wherein said emollient is selected from the group consisting of castor oil, tridecyl trimellitate, myristyl myristate, and combinations thereof.

10. The marking composition of claim 1, further comprising a colorant in an amount of from about 1% by weight to about 15% by weight of the composition.

11. The marking composition of claim 1, which additionally comprises a filler.

12. The marking composition of claim 11, wherein said filler is selected from the group consisting of calcium carbonate, talc, titanium dioxide, silica, clay, feldspar, corn starch, mica, and combinations thereof.

13. A crayon made from the marking composition of claim 1.

14. A marking composition comprising a fatty acid in an amount of from about 3% by weight to about 25% by weight of the composition, a hard wax in an amount of from about 39% by weight to about 64% by weight of the composition, a soft wax in an amount of from about 1% by weight to about 4% by weight of the composition, and an emollient in an amount of from about 5% by weight to about 15% by weight of the composition, wherein of said hard waxes and said soft waxes from about 10% to about 25% by weight of said composition are ester waxes.

15. The marking composition of claim 14, wherein said fatty acid has from about 16 to about 30 carbon atoms.

16. The marking composition of claim 15, wherein said fatty acid is stearic acid.

17. The marking composition of claim 14, wherein said ester wax is selected from the group consisting of mono-ester waxes, di-ester waxes, poly-ester waxes, and hydroxy acid ester waxes having a carbon chain length from about 22 to about 100.

18. The marking composition of claim 17, wherein said ester wax is selected from the group consisting of hydroxy polyester, beeswax, rice wax, synthetic beeswax, carnauba wax, synthetic carnauba wax, and an ester wax having an acid value less than 5, an ester value between 50 and 70, and a melting point between 78 and 83° C.

19. The marking composition of claim 14, wherein said hard wax is selected from the group consisting of candelilla wax, carnauba wax, ester waxes, beeswax, microcrystalline wax, fatty acid esters, and alkali and alkaline earth metal and ammonium salts of fatty acids, and combinations thereof.

20. The marking composition of claim 14, wherein said soft wax is selected from the group consisting of microcrystalline wax, vegetable fats, animal fats, ester waxes, fatty acid esters, and alkali and alkaline earth metal and ammonium salts of fatty acids, and hydroxypolyesters, and combinations thereof.

21. The marking composition of claim 14, wherein said emollient is selected from the group consisting of lanolin oil and its derivatives, mineral oil, fatty esters, fatty acid esters, fatty alcohols, mono- and di-esters of propylene glycols, glycerol di-esters, mono- and di-esters of polyethylene glycols, petrolatum, vegetable shortening, dimers and trimers of fatty acids, plant oils, silicones, and combinations thereof.

22. The marking composition of claim 21, wherein said emollient is selected from the group consisting of castor oil, tridecyl trimellitate, myristyl myristate, and combinations thereof.

23. The marking composition of claim 14, further comprising a colorant in an amount of from about 1% by weight to about 15% by weight of the composition.

24. The marking composition of claim 14, which additionally comprises a filler.

25. The marking composition of claim 24, wherein said filler is selected from the group consisting of calcium carbonate, talc, titanium dioxide, silica, clay, feldspar, corn starch, mica, and combinations thereof.

26. A crayon made from the marking composition of claim 14.

27. A marking composition comprising a fatty acid in an amount of from about 15% by weight to about 30% by weight of the composition, a hard wax in an amount of from about 10% by weight to about 30% by weight of the composition, and a soft wax in an amount of from about 20% by weight to about 60% by weight of the composition, wherein a portion of the hard waxes and soft waxes are ester waxes.

28. The marking composition of claim 27, wherein said fatty acid has from about 16 to about 30 carbon atoms.

29. The marking composition of claim 28, wherein said fatty acid is stearic acid.

30. The marking composition of claim 27, wherein said hard wax has a needle penetration of less than about 40 mm at 25° C. by ASTM D1321.

31. The marking composition of claim 27, wherein said hard wax is selected from the group consisting of candelilla wax, carnauba wax, ester waxes, beeswax, microcrystalline wax, fatty acid esters, and alkali and alkaline earth metal and ammonium salts of fatty acids, and combinations thereof.

32. The marking composition of claim 27, which further comprises a soft wax having a needle penetration of greater than about 40 mm at 25° C. by ASTM D1321.

33. The marking composition of claim 27, wherein said soft wax is selected from the group consisting of microcrystalline wax, vegetable fats, animal fats, ester waxes, fatty acid esters, and alkali and alkaline earth metal and ammonium salts of fatty acids, and hydroxypolyesters, and combinations thereof.

34. The marking composition of claim 27, further including an emollient selected from the group consisting of lanolin oil and its derivatives, mineral oil, fatty esters, fatty acid esters, fatty alcohols, mono- and di-esters of propylene glycols, glycerol di-esters, mono- and di-esters of polyethylene glycols, petrolatum, vegetable shortening, dimers and trimers of fatty acids, plant oils, silicones, and combinations thereof.

35. The marking composition of claim 34, wherein said emollient is selected from the group consisting of castor oil, tridecyl trimellitate, myristyl myristate, and combinations thereof.

36. The marking composition of claim 27, further comprising a colorant in an amount of from about 1% by weight to about 15% by weight of the composition.

37. The marking composition of claim 27, which additionally comprises a filler.

38. The marking composition of claim 37, wherein said filler is selected from the group consisting of calcium carbonate, talc, titanium dioxide, silica, clay, feldspar, corn starch, mica, and combinations thereof.

39. A crayon made from the marking composition of claim 27.

40. A method of making the marking composition of claim 10, comprising combining and mixing said fatty acid, said hard wax, said soft wax, and said emollient at an elevated temperature to obtain a melt mix, and combining and mixing said melt mix and said pigment.

41. A method of making the marking composition of claim 23, comprising combining and mixing said fatty acid, said hard wax, said soft wax, and said emollient at an elevated temperature to obtain a melt mix, and combining and mixing said melt mix and said pigment.

* * * * *

UNITED STATES PATENT AND TRADEMARK OFFICE
CERTIFICATE OF CORRECTION

PATENT NO. : 6,033,464
DATED : March 7, 2000
INVENTOR(S) : Michael S. Craig

It is certified that an error appears in the above-identified patent and that said Letters Patent is hereby corrected as shown below:

On the Title Page:

Under [56] References Cited, 2nd Column, line 7: "Sndedker" should read --Snedeker--.

In Column 10, line 62: The text from page 19, lines 6 and 7 is missing. After "Example 1" it should read: --This example illustrates an embodiment of the composition of the invention, prepared as follows:--

In Column 13, line 32: "3.8" should read --23.8--.

Signed and Sealed this

Twenty-sixth Day of December, 2000

Attest:

Q. TODD DICKINSON

*Attesting Officer*          *Director of Patents and Trademarks*